United States Patent [19]

Humphreys et al.

[11] Patent Number: 5,194,193
[45] Date of Patent: Mar. 16, 1993

[54] METHOD OF REPAIRING UNDERGROUND PIPE

[76] Inventors: Edward G. Humphreys, 8165 Oak Moss Dr., Cordova, Tenn. 38018; Robert D. Rice, 1629 Kimbrough Rd., Germantown, Tenn. 38138

[21] Appl. No.: 869,763

[22] Filed: Apr. 16, 1992

[51] Int. Cl.⁵ ............ B22D 19/10; B29B 17/00; B32B 35/00; E04B 1/16
[52] U.S. Cl. ............ 264/35; 29/402.18; 138/97; 156/94; 264/36; 264/37; 264/269
[58] Field of Search ............ 264/33, 34, 35, 36, 264/333, 261, 263, 266, 269, 317; 156/94; 29/402.18; 138/97-99

[56] References Cited

U.S. PATENT DOCUMENTS

| | | | |
|---|---|---|---|
| 1,736,293 | 11/1929 | Van Denburg | 264/269 X |
| 3,272,894 | 9/1966 | Roach | 264/36 |
| 3,315,017 | 4/1967 | Kemp | 264/36 |
| 3,356,777 | 12/1967 | Barrett | 264/36 |
| 3,608,000 | 9/1971 | Anderson | 264/36 |
| 3,634,560 | 1/1972 | Anderson | 264/36 |
| 3,894,131 | 7/1975 | Speech | 264/36 X |
| 4,244,895 | 1/1981 | Nakashin | 264/36 |
| 4,245,970 | 1/1981 | St. Onge | 264/36 X |
| 4,318,835 | 3/1982 | Clarke | 264/36 |
| 4,394,202 | 7/1983 | Thomas et al. | 264/36 X |
| 4,419,163 | 12/1983 | Yamamoto et al. | 156/94 |
| 4,421,698 | 12/1983 | Vanderlans | 264/269 X |
| 4,456,401 | 6/1984 | Williams | 264/36 X |
| 4,582,551 | 4/1986 | Parkes et al. | 264/36 X |
| 4,643,855 | 2/1987 | Parkes et al. | 264/36 |
| 4,956,032 | 9/1990 | Hahn et al. | 264/36 X |
| 5,066,208 | 11/1991 | Warmerdam | 264/36 X |

FOREIGN PATENT DOCUMENTS

| | | | |
|---|---|---|---|
| 48510 | 10/1985 | Fed. Rep. of Germany | 264/333 |
| 04086 | 11/1982 | PCT Int'l Appl. | 264/36 |

Primary Examiner—Karen Aftergut
Attorney, Agent, or Firm—John J. Mulrooney

[57] ABSTRACT

This method for the trenchless, in situ repair of underground pipe includes the steps of isolating a section of pipe to be repaired, heating a sealing material (having predetermined physical and chemical properties) to a liquid state, pumping the liquid material, under pressure as required, into the isolated section of pipe; circulating the liquid through the isolated section of pipe; and forcing the liquid into and through cracks in the pipe and into the soil surrounding the pipe. This is a thermal process wherein the molten material which is forced into the cracks and soil, cools and solidifies. The remaining liquid circulates through the isolated section of pipe and stays in a liquid state, because of retained internal heat, until it is removed from the pipe for storage and reuse. With this process, a novel bottom plug is used which allows the sealant to be applied to all cracks, crevices and even openings found where the smaller pipe connects to the larger pipe. If water is present within the system being repaired, a bottom plug allows it to accumulate and be drained so as not to interfere with the sealing process.

21 Claims, 4 Drawing Sheets

METHOD OF REPAIRING UNDERGROUND PIPE

BACKGROUND OF THE INVENTION

This invention relates generally to the in situ repair of underground pipe systems, and more particularly to a trenchless method (no excavation) of repairing in-place holes, cracks and defective joints in underground gravity flow pipe systems, such as municipal and industrial sewer systems.

The integrity of underground pipe systems, particularly sanitary sewer systems, is a matter of substantial concern to urban communities. Sanitary sewer systems are designed to convey raw sewage and wastewater to treatment facilities where the sewage is processed and the wastewater is treated for return to the environment. Ideally, the sewer system will convey the raw sewage and wastewater to a treatment facility without leaking or spillage. Due to age and numerous other causes, however, present day urban sanitary sewer systems are in a state of disrepair. Most of these systems have cracks, holes, and open joints in the sewer mains which are generally buried beneath streets. Defects in the lateral pipes, which extend from private buildings to the sewer mains, cause even more problems. Also prevalent are poor or no joint seals between the adjacent lateral pipe sections, and defective or no joint seals at the connections between the laterals and the sewer mains. These defects can cause serious concern for the communities in which they appear. Defects such as breaks, cracks, or open pipe joints, allow storm water and ground water to infiltrate into the sewer system and, under some conditions, to overload the waste water system. One result is that the rain water and ground water infiltrating into the sewer system must be treated, just as the wastewater and raw sewage must be treated, at a substantial, unnecessary expense to the community. Another result of such defects in sewer systems is that raw sewage is allowed to escape from the system into the surrounding earth where the ground water becomes contaminated and a sanitary problem is created. Also, during rainy weather the rain water entering the sewer system can overload the treatment facilities causing untreated, raw sewage to be discharged into neighboring rivers, lakes and streams. The escape of raw sewage from defective pipes; the overloading of sanitary treatment facilities; and the consequent dumping of untreated or improperly treated raw sewage directly into rivers, lakes and streams causes both unsanitary health hazards and ecosystem problems in violation of environmental regulations. Another problem caused by the infiltration of ground water into sewer pipe is the continuing deterioration of the buried pipe. When a crack in buried gravity flow pipe allows ground water to enter, it typically allows soil particles to enter the pipe. As the soil flows into the pipe with the ground water, a void will form on the outside of the pipe. Because a buried pipe gets much of its stability from the equal pressure of the surrounding soil, a void will cause unequal stress which weakens the structure and leads to additional cracks, breaks, or other deterioration. This in turn causes more soil to be lost by draining into the pipe. If allowed to continue, such voids can cause a total collapse of the pipe. The collapse of the overhead soil around a buried pipe can cause a cave in all the way to the surface. Indeed, many pot holes and sinking areas in city streets are caused by such voids collapsing.

The obvious solution to the problem of defective sanitary sewer pipes is replacement which requires excavation. This solution must be performed substantially in the middle of busy urban streets and is not a practical solution because it is expensive, inconvenient and dangerous. Also, in most instances, it is not the total pipe that needs replacement, but simply a small part or crack or leaky joint therein which requires repair.

The need for a workable trenchless, in-place, non-structural technique for underground pipeline rehabilitation has been a long known problem. Several innovative technologies have emerged which create a structurally new thermoplastic or thermosetting plastic pipe within the existing deteriorated pipe in situ. These techniques, sometimes called sliplining, are one solution to the problem of exfiltration of raw sewage into the surrounding earth, but, generally do not solve the problem of infiltration without excavation. Also, sliplining, and other similar methods, do not fill the existing voids around the pipe; and defective lateral to main connections often remain a problem. The methods of structural repair are expensive, time consuming and, in most cases, not needed to repair isolated cracks and holes or defective joints in the sewer system. Moreover, most of these techniques have the effect of decreasing the pipe diameter, and therefore can reduce the capacity of the system when such systems actually need additional capacity.

A recently completed study of the condition and problems of the sanitary sewers in one large urban area, which is regarded in the wastewater management industry as exemplary of other large urban areas, disclosed substantial deterioration of the pipes and pipe joints and indicates that major efforts and new techniques are needed to rehabilitate, repair, replace or upgrade the sewer system to meet current environmental and public health standards.

Accordingly, there is a need for an inexpensive, non-structural, but effective and permanent in-place rehabilitation technique for selectively sealing isolated holes, cracks and defective joints in sanitary sewer pipe. Attempts have been made and processes have been proposed and described over the years for trenchless, in-place, non-structural underground pipe repair. One early attempt is disclosed in U.S. Pat. No. 1,736,293. This prior process pumped Portland cement grout, under pressure, into an isolated section of the defective pipe to be repaired. The theory is that the grout will be pushed into any cracks or fissures where it will harden and seal the leak. There are several drawbacks to this prior method. Portland cement grout, or other unspecified grouts, will cure, or harden, (a chemical reaction) throughout its entire volume at the same time. This hardening feature will cause plugging of the pipe as well as the leaks. This prior process attempts to avoid the problem of hardening by diluting the main body of the grout with water or other chemicals once it is in place. While such diluting can inhibit curing and hardening of the main body of the grout, it can also dilute and weaken the grout which has been forced into the cracks and fissures to seal the leaks in the deteriorated pipe. Another substantial problem with this prior process has both economic and environmental aspects. Rich Portland cement grout, as used in this prior process, is expensive, and the entire volume of Portland cement grout used to flood the pipe, minus the relatively small amount forced into the cracks, cannot be reused and must eventually be wasted at a substantial economic loss. Another drawback of the grout process is the problem of safe disposal of hundreds, and perhaps thousands, of gallons of used Portland cement or chemical grout waste, creating a potential ecological-environmental problem. Also, Portland cement deteriorates rapidly in an acid environment, and many sewer systems naturally generate sulfuric acid which collects on the walls of the pipe. It is common to see concrete (Portland cement and aggregate) pipe in sanitary sewer systems corroded completely away, where the acid in the system has been in contact with the pipe wall. The Portland cement grout pipe repair process suggested in U.S. Pat. No. 1,736,293 is not a technique that is used in the pipe repair industry.

Another prior process for the in-place repair of underground pipe is disclosed in U.S. Pat. No. 3,227,572, which suggests the use of chemical dispersing agents with a small percentage (0.02%) of wax particles. The process includes the preparation of a dispersion comprised of microscopic particles of solid wax of 0.1 to 2.5 microns. These particles are dispersed throughout a water medium. When the treated water is introduced into the defective pipe, the water containing the microscopic particles of solid wax seeps out through cracks and into the surrounding soil. If the soil is a fine grain soil, it will act as a filter and the microscopic particles of wax will begin to build up in the soil adjacent to the crack in the pipe. Eventually, if internal pressure is continuous and other conditions permit, a wax membrane will be formed. As the wax membrane accumulates and the surrounding soil becomes more and more saturated with water, less and less water will flow through the crack and penetrate the soil, and the membrane growth will slow. Because of the microscopic size of the wax particles, the membrane will not form in gravel or coarse granule soils. The membrane if formed, will be relatively thin and fragile. When the internal pressure is removed, the membrane can be subject to immediate failure from the external ground water pressure. This microscopic wax particle dispersion process may not be cost effective because the entire unused volume of wax particle dispersion within the pipe must be disposed of and, therefore, wasted. Another problem with this wax particle method in a water dispersion is the relatively complicated preparation process for the dispersant as shown by the examples stated in the patent. This microscopic wax particle dispersant method for the in-place repair of underground pipe is not a technique that is recognized or used in the pipe repair industry.

Another prior process for the trenchless, in-place repair of buried pipe is disclosed in U.S. Pat. No. 4,244,895. This method suggests the use of a chemically hardening grout, such as Portland cement. The pipe section to be repaired is isolated and filled with grout under pressure so that the grout is pushed into and through any cracks in the pipe. Then, instead of diluting the grout to prevent internal hardening (as in U.S. Pat. No. 1,736,293 discussed above) the grout is pushed out with water before it sets up, using a sliding plug as a divider to separate the grout and water. This process has the same problems as mentioned in the discussion of U.S. Pat. No. 1,736,293 above, such as diluting the grout which remains in the cracks, or washing all or part of the grout out of the cracks. Also, all of the nonused grout within the pipe will be wasted and must be disposed of in an environmentally approved manner. The Portland cement grout in the cracks will be easily attacked by acids naturally occurring in the sanitary sewer system. A significant problem with this prior method would be getting a sliding plug to separate two different fluids (grout and water) within a deteriorated sewer pipe, with all of its irregular features. This prior process for repairing underground pipe using chemically hardened grout is not a technique that is recognized or used in the pipe repair industry.

There are no effective prior art processes capable of a non-structural, trenchless, in-place repair of sewer main pipe, lateral pipe, lateral pipe joints and the connection joint between the lateral pipe and sewer pipe. There is a need for an efficient, effective, permanent, relatively simple non-structural process for the in-place repair of underground pipe.

SUMMARY OF THE INVENTION

In view of the foregoing, it is an object of this invention to provide a new and improved method of, and apparatus for, the trenchless repair of underground pipe.

It is another object of the invention to provide a new and improved method of, and apparatus for, the in-place repair of underground pipe.

It is another object of the invention to provide a new and improved method of, and apparatus for, the non-structural repair of underground pipe.

It is another object of the invention to provide a new and improved thermal process of repairing underground pipe using heated liquid material having predetermined physical, chemical and thermal properties.

It is another object of the invention to provide a new and improved method of repairing sewer main pipe and/or building lateral pipe and/or the joints between building lateral pipe and/or the joints between building lateral pipe and sewer main pipe, and/or the joints between the sewer main pipes.

It is another object of the invention to provide a new and improved method of repairing underground pipe involving the use of a sealant material that is environmentally safe, fully recoverable and reusable.

A significant feature of the invention is that it is a thermal process in which a molten material, having predetermined physical, chemical and thermal properties, is used to flood and circulate through an isolated section of the underground pipe in need of repair. The liquid heated material will be forced into and through the cracks in the pipe and through the open joints between the pipes; and will contact and join with the soil surrounding the pipe. It will then harden and form a seal in the cracks and joints; and form a matrix that is virtually impermeable to leaking by exfiltration and infiltration. The thermal and physical properties of the molten material permit the liquid within the pipe to remain in a heated, liquid state while the material forced into and through the cracks and joints will cool and solidify. The molten material will fill and seal the cracks and joints, and will fill the adjacent voids in the surrounding soil. The unused molten material is recoverable for reuse. Briefly stated, the present invention provides a thermal process of repairing holes, cracks and defective joints in underground pipe and pipe systems. This involves the steps of isolating a section of pipe or joint to be repaired and introducing, under controlled pressure, a liquid material into the isolated section. The liquid is circulated through a circuit including the isolated section of pipe and a heat exchanger, if needed, to maintain the material in a liquid state and at a controlled temperature. The pressure forces the liquid through the holes, cracks and defective joints in the pipe whereby the material in the holes, cracks and defective joints begins to solidify and seal the pipe against leaking. The final step is the recovery of the unused molten material from the isolated section of pipe for reuse.

DESCRIPTION OF THE PREFERRED EMBODIMENTS

Figure 1:
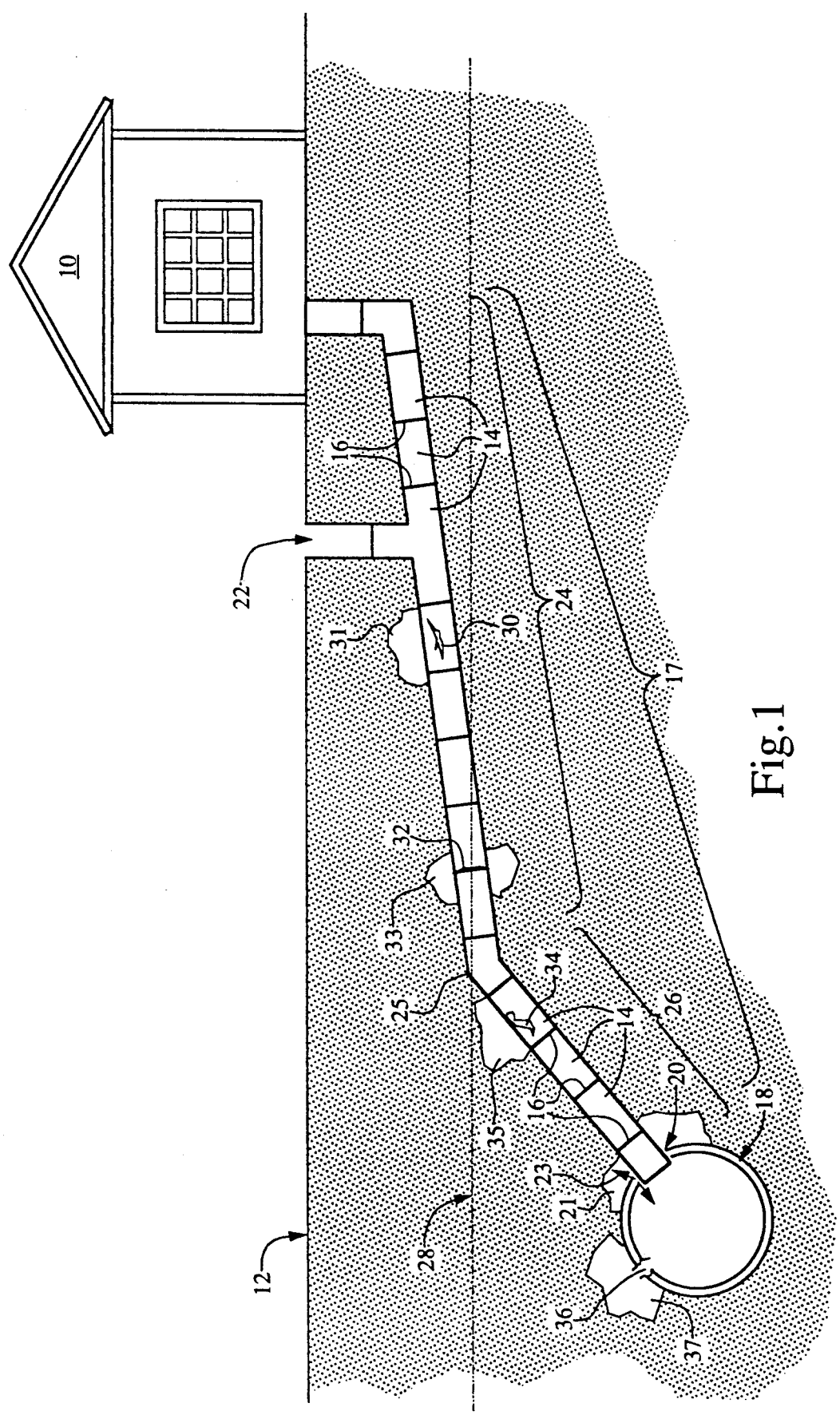
FIG. 1 is an elevational view of a typical house lateral-to-sewer main connection, showing several defects such as holes, cracks and leaky joints commonly found in sewer systems, and also showing voids in the soil adjacent to the defects.

Sanitary sewer systems typically are comprised of miles of sanitary sewer main pipe which is usually buried beneath streets and which is connected by lateral pipe to individual private buildings. A typical building lateral-to-sewer main connection is illustrated in FIG. 1. A private building or house 10 is at ground level 12. A plurality of relatively short building lateral pipes 14 are connected end-to-end at joints 16 to form a building lateral, generally indicated at 17, which extends from building 10 to sewer main 18 where the lateral and main are connected at a tap or joint 20. A building lateral typically comprises an upper lateral, generally indicated at 24, which extends from the building 10 to an undefined point near the main, indicated at 25, and a lower lateral, generally indicated at 26, which extends from this point 25 to the main 18. A "clean-out" 22 extends from ground level 12 to the upper lateral 24. The ground water level or water table is indicated at 28 and its depth will vary from location to location.

The upper lateral 24 has a crack 30 and a void 31 in the adjacent soil; and a defective or leaking joint 32 and a void 33 in the adjacent soil. The lower lateral 26 has a crack 34 and a void 35 in the adjacent soil. The connection (tap) or joint 20 between the lower lateral 26 and the sewer main 18 is defective, and a void 21 has developed in the adjacent soil; and the sewer main 18 has a hole 36 and a void 37 in the adjacent soil. The bidirectional arrow 23 through defective joint 20 represents the infiltration of ground and rainwater and the exfiltration of raw sewage as described above. Such infiltration and exfiltration also occurs at the cracks 30, 34, hole 36 and at the joint 32.

In a typical building to sewer main connection, the laterals will consist of 40 to 80 lineal feet of 4 or 6 inch diameter pipes connected end-to-end. The sewer mains will usually consist of 8, 10 or 12 inch pipe which carry the sewage to other larger pipes which in turn convey the sewage on to a treatment facility.

Prior to application of the present process to repair defective lateral pipe, the sewer system, or a part thereof is typically inspected as follows: a closed circuit television camera (not shown) is lowered through "clean-out" 22 into the upper lateral. The camera can locate cracks, such as at 30, and defective joints, such as at 32, in the upper lateral; and cracks, such as at 34, in the lower lateral; and, when extended to the connection 20 between lower lateral and sewer main 18, may locate defective joint 20 and hole 36 in the main, as well as other problems, and provides a measurement of the distance from "clean-out " 22 to sewer main 18.

Figure 3:
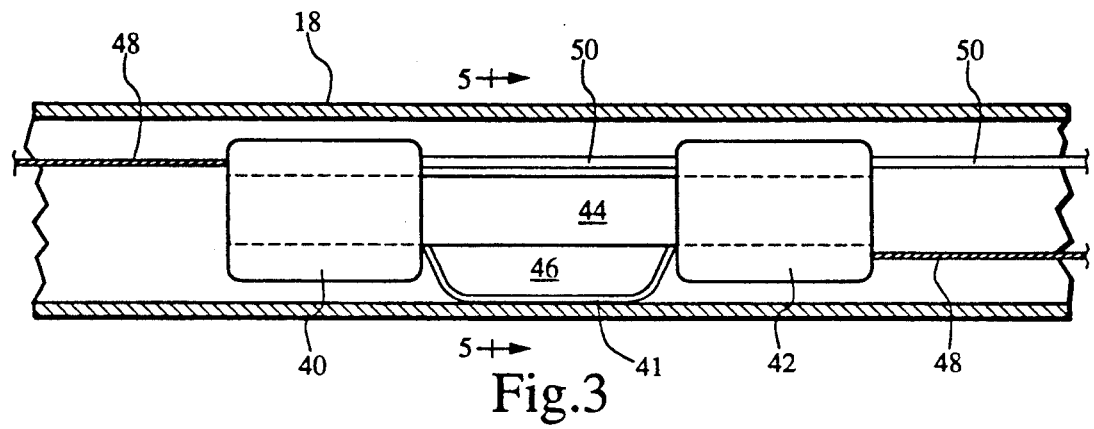
FIG. 3 is an elevational view showing the novel adjustable length bottom plug being pulled into position for use in practicing this thermal pipe repair process.
Figure 4:
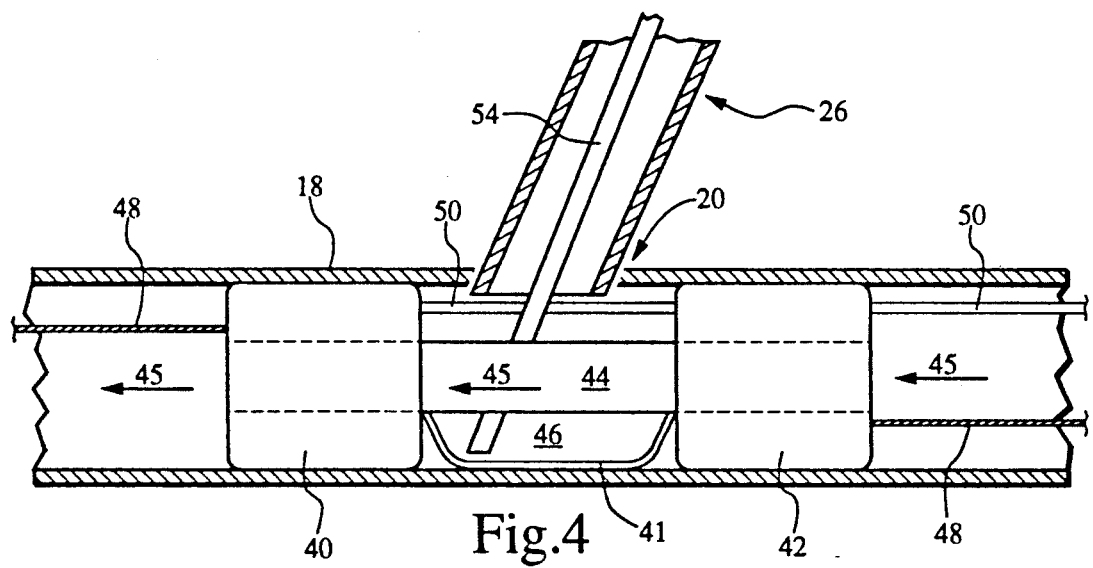
FIG. 4 is an elevational view showing the novel bottom plug in position at the junction of a building lateral with the sewer main to isolate a section of sewer main and the interconnecting building lateral.
Figure 5:
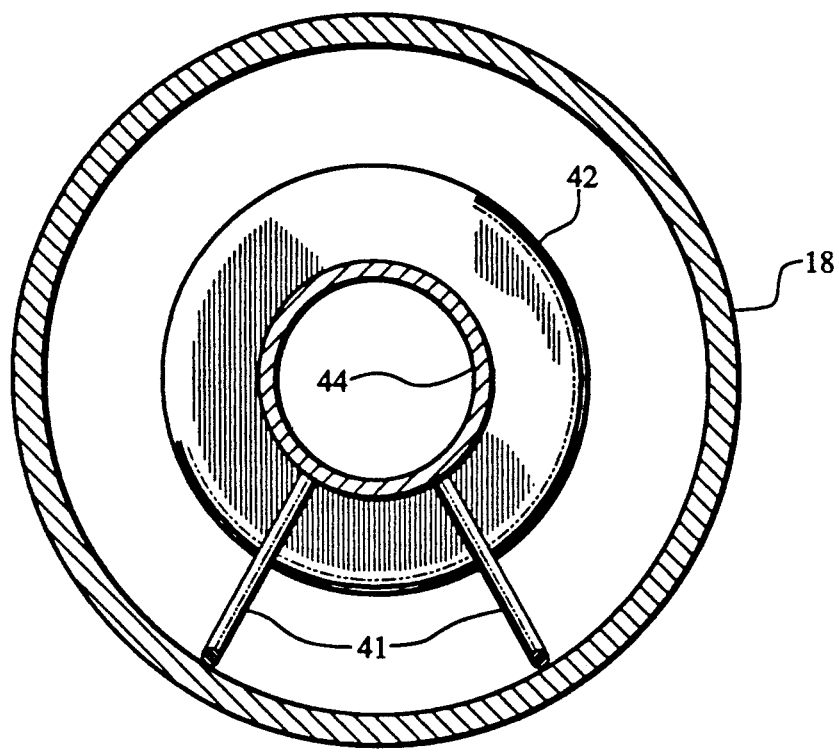
FIG. 5 is a cross-sectional view of the bottom plug taken along the line 5—5 in FIG. 3.

After the defects are located, the lateral containing the defects is isolated from the sewer main by a novel bottom plug. A bottom plug (FIGS. 3 and 4) is comprised of a first inflatable plug 40 and a second inflatable plug 42 on either side of a pair of skids 41 and at either end of a connecting flow through pipe 44. The flow through pipe 44 extends between plugs 40 and 42. The length of a sump area 46 is determined by the length of flow through pipe 44, which can be varied. Pipe 44 permits sewage (indicated by arrows 45) to flow through the bottom plug while repairs are being made. A pull rope 48 permits the bottom plug to be pulled along the sewer main 18 for positioning adjacent to a building lateral-to-sewer main connection 20 or a section of sewer main 18 in need of repair. An air line 50 is connected to the inflatable plugs 40 and 42 for inflating those plugs to form a water tight fit within the sewer main 18. This isolates the section of sewer main between plugs 40 and 42, this same section also being adjacent to lateral 17 to be repaired. A sump area 46 is defined in the isolated sewer main section by the inflated bottom plugs 40 and 42. The television camera also is useful to supervise the positioning and inflation of the bottom plug. Once the bottom plug is properly positioned and inflated, the camera may be removed.

An inflatable flow through top plug 52 (FIG. 2) is positioned along a down line 54. After the top plug 52 is positioned along the down line 54, the top plug 52, down line 54 and a top line 56 are lowered into position in the lateral 17. The top plug 52 when required is inflated to provide a seal within the lateral 24. The sealant material heating and pumping equipment 58 melts the sealing material to a molten state and pumps the molten material into the down line 54 to flood the sump area 46, and the entire lateral 18 to the top plug 52. The heating and pumping equipment 58 is part of a circuit including the isolated section of main pipe 18 and lateral 17, through which the liquid sealant is circulated. The pumping system is pressurized, as required, to force the liquid into and through the holes and cracks such as 36 in the isolated section of sewer main 18, and in the cracks or holes in the isolated section of lateral such as 30 and 34, and into and through the defective joints such as the sewer main-to-lateral connection 20 and the defective joints between the lateral pipe sections 14 such as at 32. The liquid not only penetrates the holes and cracks in the lateral pipe, but, equally important, because of the design of the bottom plug, the liquid penetrates and seals the cracks found around the sewer main-to-lateral connection 20.

The liquid material, which is forced into and through the holes, cracks and defective joints, flows into the voids between the sewer system pipe and the surrounding soil medium. There it begins to cool, mix with the soil and harden to form a seal against the exfiltration of sewage from within the sanitary sewer, and, more importantly, against the infiltration of ground water into the sanitary sewer system.

Figure 2:
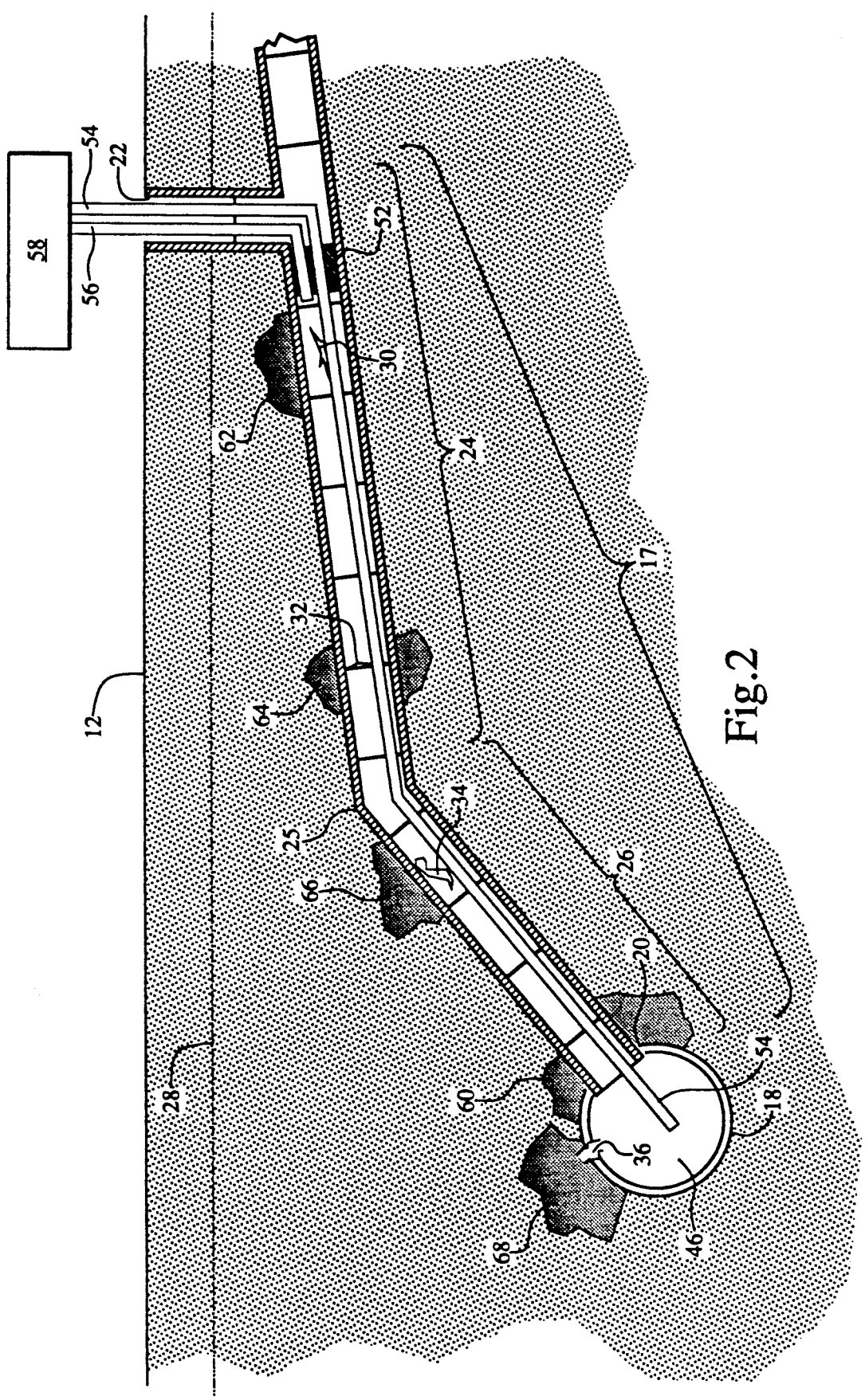
FIG. 2 is a view of the defective underground pipe system shown in FIG. 1 after being repaired according to the method of the present invention.

Referring to FIGS. 1 and 2, the voids 21, 31, 33, 35 and 37 that surround defects 20, 30, 32, 34 and 36, are either partially or completely filled with the hardened sealant material after the repair as shown at 60, 62, 64, 66 and 68 in FIG. 2.

While maintaining the system under pressure, the liquid is circulated from the sump area 46 through the lateral 17, through top line 56 and back to the heating and pumping equipment 58 where it is reheated, if needed, and then returned to the isolated sump area 46 and lateral 17 through down line 54. This recirculation and heating keeps the material in a molten state within the sump area and lateral, while the material already in the cracks, holes, voids and soil tools and solidifies. The isolated section of pipe may be preheated prior to being flooded with the liquid material. Once this solidification occurs, the liquid remaining in the sump area and lateral is extracted and returned to the pumping equipment for storage and future use. The direction of circulation can also be reversed.

After the unused liquid is removed from the sump area 46 and the lateral, the top plug 52 is deflated and, along with the bottom line 54 and the top line 56, is removed from the lateral. The bottom plug is deflated and removed from the sewer main 18 or pulled to the next lateral needing repair.

The sealant material used in this thermal repair process, generally, is a material having a melting point between 100° F. and 212° F., has a low coefficient of thermoconductivity, and has a low viscosity in the liquid state. It is resistant to water and vapor, forms a stable material in the solid state which will not react chemically with concentrated alkalines or acids. It is capable of transformation from the solid to the liquid state and from the liquid to the solid state without adversely affecting its physical, chemical and thermal properties, and is capable of being modified or blended with additives to create a sealant material having predetermined desired properties. It is a non-polluting, non-hazardous, environmentally safe material which may be used and reused until it is consumed in the process without creating a disposal problem for wasted material.

In the preferred embodiments, the sealant material is petroleum wax selected from the group consisting of paraffin wax, microcrystalline or microwax, slack wax, and natural waxes such as beeswax and vegetable wax. The preferred sealant material is slack wax or paraffin wax. These sealant materials all have the characteristics of being highly resistant to acids, alkalines, water and the other substances commonly found in municipal sewage and soil. The coefficient of thermal conductivity for wax is relatively low, thus, the liquid sealant circulating in the pipe remains in a liquid state; whereby, the liquid sealant that is forced into and through the cracks in the pipe and into the voids, can cool and solidify to form a seal. This makes possible the cooling and solidifying of the wax in the cracks, holes, defective joints and surrounding soil, while keeping the circulating wax in a liquid state within the pipe being repaired. In a molten state, paraffin waxes are usually clear liquids having a low viscosity in the range of 20 to 140 saybolt universal seconds (sus). This physical property facilitates the pressure forcing of the liquid wax through the small cracks, holes and defective joints and into the soil. Since the waxes used will have a melting point below the boiling point of water, and since some water is usually present in the sewage system during the sealing process, it is important not to use a temperature which could cause any water present to flash into steam as this could be hazardous and/or detrimental to the sealing process. Paraffin wax is reusable and there is little or no waste or disposal problems. Once the wax has hardened in the joints, cracks and soil, the wax remaining inside the pipe is recoverable for re-use. Solid paraffin wax is very stable and will not deteriorate in the presence of alkalines, acids or other materials common to municipal sewers, storm sewers, and some industrial sewers. Paraffin wax is a non-polluting, non-hazardous and environmentally safe material to use in the pipe repair. When the liquid wax penetrates the soil medium around the pipe, it forms a strong, stable, water-tight matrix with the soil. The soil can be fine, coarse, granular or even gravel or rocks; and the voids adjacent to the pipe will be filled. Since wax flows more freely through the coarse materials, the amount of wax applied within the various soil materials is automatically controlled, with the most wax going to the coarsest and most problematical soils. The paraffin wax can be modified or blended with additives to enhance certain performance properties such as melting point, color, thermal conductivity, surface tension, viscosity, ductility, water absorption, hardness, and other physical properties as known to those skilled in the art. The wax used in this process could be modified by color additives to enable visual monitoring of the repairs. The melted paraffin wax is a true liquid and its penetration into the surrounding soil can be controlled by the temperature and pressure in the pipe under repair. The specially shaped and designed bottom plug used during this process allows water, if present within the lateral being repaired, to accumulate or drain below the low point of the lateral where the water will not interfere with the sealing process. Also, the novel bottom plug permits the sewer main 18 to remain in operation during the repairs. The pressure within the pipe being repaired will be greater than that created by the surrounding ground water. This will preclude the ground water from entering the pipe during the seal-forming process. Approved chemical root inhibitors can be added to the liquid wax to stop growth or regrowth within the repaired pipe. The liquid wax sealing process of the present invention can be used to repair gravity flow sanitary sewer pipe, storm sewer pipe, some industrial sewers and piping, low pressure irrigation pipe and other buried gravity flow and low pressure pipe and structures.

The present thermal pipe repair process has been tested on underground pipe including tests in four soil classifications: fine grain soil (clay-silt mixture), sand, pea gravel and gravel (max. size ¾" dia.). In all cases the melted liquid wax compound filled and sealed the cracks and open joints and penetrated into the surrounding soil to form a water-tight barrier against exfiltration and infiltration. Several intentionally placed voids in the soil were completely filled by the material. The testing involved several sizes and shapes of openings in several sizes of pipe. Longitudinal and transverse cracks having widths of 3/32" were used as a basis for comparison with other openings up to ½". One test included approximately 25 feet of 4" concrete pipe and 4" PVC pipe with multiple joint spacings up to ¼" wide, and drilled and sawed holes in the PVC pipe. The liquid wax sealing process of the present invention completely sealed all leaks and later passed a 5 p.s.i. water test with no leakage.

Thus, it can be seen that the melted sealant method of the present invention has accomplished its desired objectives by providing a trenchless, economical, safe and practical method for repairing underground pipe in-place.

Wherefore, having thus described our invention, what is claimed is:

1. A method of repairing defects in underground gravity flow sewer pipe systems comprising the steps of:
    providing a material having predetermined physical and thermal properties, said properties including a capacity repeatedly to be converted from a solid state to a liquid state by application of heat and a capacity repeatedly to be reconverted from said liquid state to said solid state by removal of heat;
    isolating a section of pipe to be repaired;
    heating said material to a liquid state;
    flooding said isolated section of pipe with said liquid material;
    forcing said liquid material into and through said defects and into contact with soil surrounding said pipe, whereby said liquid material in said defects and in contact with said soil loses heat to said soil and is cooled and is solidified to form seals in said defects;
    maintaining said liquid material in said isolated section of pipe in said liquid state while said liquid material forced into and through said defects and into contact with said soil is cooled and is solidified;
    removing unused liquid material from said isolated section of pipe; and
    storing said unused liquid material for reuse.

2. The method according to claim 1 wherein said material is a petroleum wax selected from the group consisting of paraffin wax, microwax and slack wax.

3. The method according to claim 1 wherein said material has a melting point on a range of approximately 100° F. to approximately 212° F.

4. The method according to claim 1 wherein said isolated section of pipe is comprised of a section of sewer main in connection with a section of sewer lateral pipe.

5. The method according to claim 1 wherein said isolated section of pipe is comprised of a section of sewer lateral pipe.

6. The method according to claim 1 wherein said isolated section of pipe is comprised of a section of sewer main pipe.

7. The method according to claim 1 wherein said defect is an open joint which is comprised of a defective joint connection between a sewer main and a sewer lateral or between adjacent lateral sections of pipe.

8. The method according to claim 1 wherein said material is heated to a liquid having a viscosity range of 20 to 300 saybolt universal seconds.

9. The method according to claim 1 wherein said isolated section of pipe is preheated prior to being flooded with said liquid material.

10. The method according to claim 1 wherein said liquid material in said isolated section of pipe is maintained in said liquid state by heating said liquid material.

11. The method according to claim 1 wherein said liquid material in said isolated section of pipe is maintained in said liquid state by circulating said liquid material through said isolated section of pipe while applying heat to said liquid material.

12. The method according to claim 1 wherein said step of storing said unused liquid material for reuse includes storing said unused liquid material in its liquid state for reuse.

13. The method according to claim 1 wherein said predetermined physical and thermal properties further include a melting point in a range of approximately 100° F. to 212° F. and a viscosity in a range of 20–300 saybolt universal seconds.

14. The method according to claim 1 wherein said step of storing said unused liquid material for reuse includes storing said unused liquid material in its solid state for reuse.

15. A trenchless, non-structural method for the repair of defects in underground gravity flow sewer pipe systems comprising the steps of:
    isolating a section of pipe having defects to be repaired;
    providing heating and pumping means which, when connected to said isolated section of pipe, form a circuit therewith;
    heating a wax to a liquid state;
    flooding said isolated section of pipe with said liquid wax;
    maintaining an internal pressure on said liquid wax sufficient to force said liquid wax into and through said defects within said isolated section of pipe and into voids in soil surrounding said pipe and into contact with said soil, whereby said liquid wax in said defects and in contact with said soil loses heat to said soil and is cooled and is solidified to form seals in said defects;
    circulating said liquid wax through said circuit while said seals are formed in said defects;
    removing unused liquid wax from said isolated section of pipe; and
    storing said unused wax for reuse.

16. The method according to claim 15 wherein said liquid wax in said isolated section of pipe is maintained in said liquid state by heating said liquid wax.

17. The method according to claim 15 wherein said step of storing said unused wax for reuse includes storing said unused wax in its liquid state for reuse.

18. The method according to claim 15 wherein said wax is selected from the group consisting of petroleum wax and natural wax.

19. The method according to claim 15 wherein said wax has a melting point in a range of approximately 100° F. to approximately 212° F.

20. The method according to claim 15 wherein said wax is comprised of a compound or blend wax having a viscosity in a range of 20 to 300 saybolt universal seconds.

21. The method according to claim 15 wherein said step of storing said unused wax for reuse includes storing said unused wax in its solid state for reuse.

* * * * *